Patented July 17, 1951

2,560,919

UNITED STATES PATENT OFFICE 2,560,919

INTERMITTENT FILM ADVANCING MECHANISM UTILIZING AIR PRESSURE

Alda V. Bedford, Princeton, N. J., assignor to Radio Corporation of America, a corporation of Delaware Application March 22, 1949, Serial No. 82,867

6 Claims. (Cl. 88—18)

This invention relates to motion picture film apparatus, and particularly to a motion picture film projector having an intermittent pull-down mechanism with extremely short pull-down periods.

The application is directed to improvements of the rapid pull-down mechanism disclosed and claimed in co-pending application, Ser. No. 82,866, filed March 22, 1949. In this co-pending application, the pull-down is accomplished by a blast of air under pressure, the film being previously formed into a loop one frame long just ahead of the film gate, the film thus being advanced one frame into the gate aperture. Since the advancement of one frame is made in about one twelve-hundredth of a second, improvements have been provided to obtain better control of the air blast and of the acceleration and deceleration of the one frame film loop. Thus, a smoother action and more protection for the film are provided.

The mechanism is suitable for the normal projection of motion picture film without the usual light interrupting shutter and for use in a television scanning system of the flying spot type. The invention is being described in association with the latter system for purposes of illustration, the air and film loop controls operating the same for any use of the projector.

The principal object of the invention, therefore, is to facilitate the intermittent positioning of the frames of a motion picture film in a projection aperture.

Another object of the invention is to provide improved air and film loop controls for a rapid pull-down mechanism for a motion picture projector.

A further object of the invention is to provide an improved means for rapidly changing picture frames on a motion picture film in a projection aperture by an air blast having special port and film loop controls.

A still further object of the invention is to provide an improved type of air and film loop controls for an intermittent film mechanism, which provides a pull-down time of the order of one-thousandth of a second.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
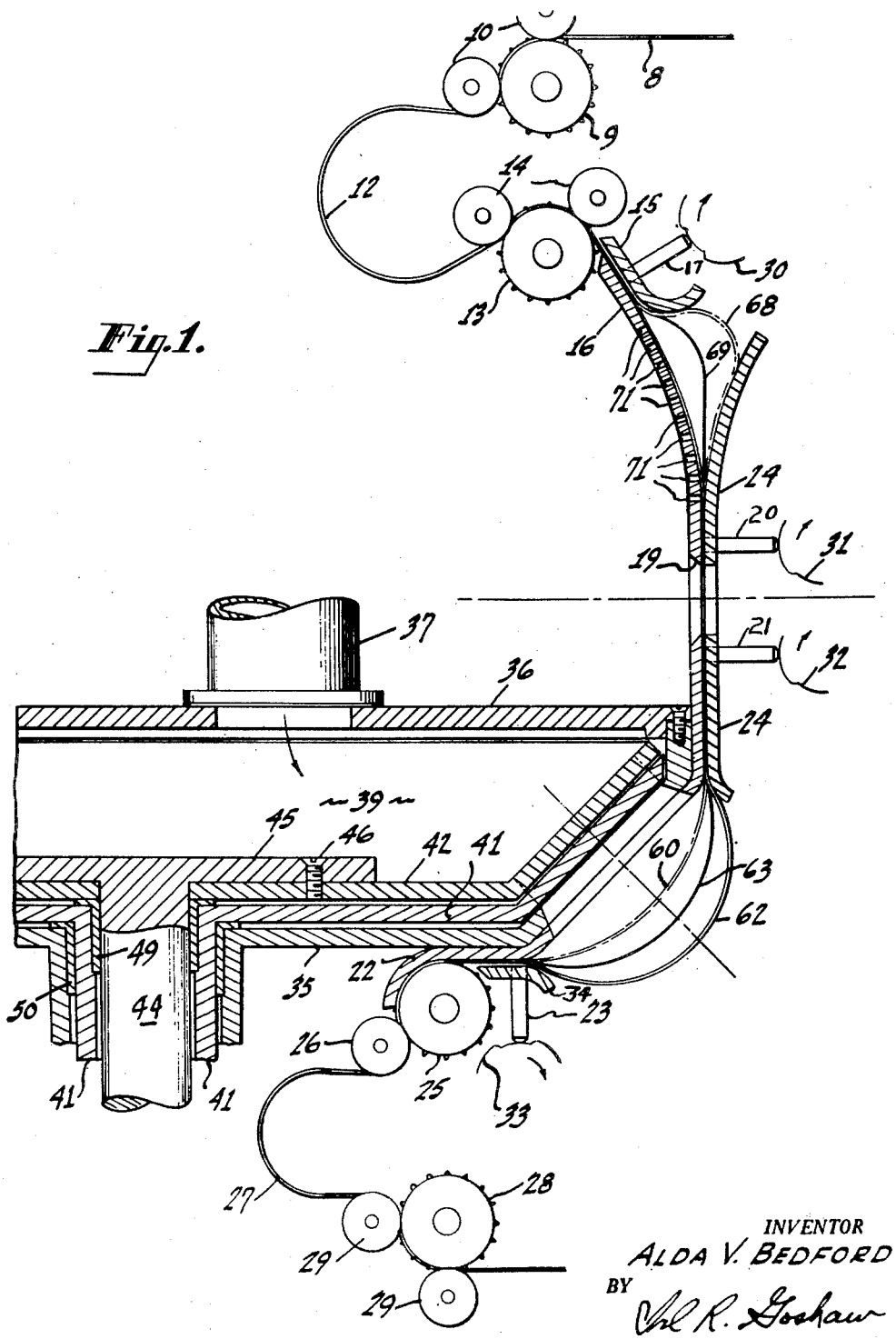
Fig. 1 is an elevational view, partly in cross-section, of the pull-down mechanism embodying the invention.

Referring now to the drawings, in which the same numerals identify like elements, a motion picture film 8, of either the thirty-five millimeter or sixteen millimeter type, passes over a continuously rotating sprocket 9, under pad rollers 10, the film then passing into a loop 12 and to an intermittently driven sprocket 13 with its associated pad rollers 14. The film then passes between the guide end of a gate shoe 16 and a guide 15 to a projection aperture 19 between the gate shoes 16 and 24, the film forming into a loop between the guide 15 and shoes 16—24, as will be described hereinafter.

After passing the projection aperture 19, the film will be formed into a lower loop, as will be described later, and will then pass between a guide 22 and a guide 34 to an intermittent sprocket 25 with its associated pad roller 26. The film then passes into a lower loop 27 from which it is taken by a continuously rotating sprocket 28 having pad rollers 29. Thus, the film is continuously and uniformly driven by sprockets 9 and 28, and intermittently advanced by sprockets 13 and 25. Through guide 15, a clamp 17 passes; through shoe 24, clamps 20 and 21 pass; and through guide 34, a clamp 23 passes. Clamps 17, 20, 21, and 23 are actuated by a respective plurality of cams 30, 31, 32, and 33. The clamps may contact the film along its edge or along a narrow strip between adjacent frames to prevent scratching of the film. Although clamps 20 and 21 are shown at the aperture 19 to hold the film 8 stationary in the aperture during the forming of a loop above it, the friction between shoes 16 and 24 could be such that the clamps 20 and 21 are unnecessary.

Figure 2:
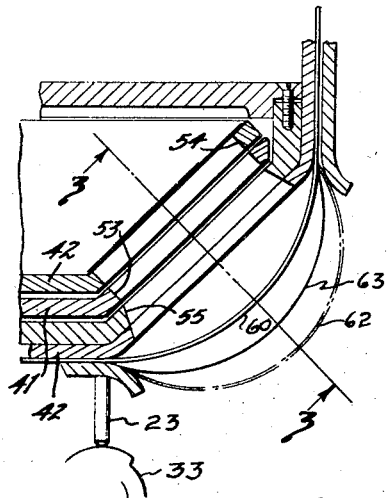
Fig. 2 is a detailed view of the lower loop forming portion of the intermittent mechanism of the invention.
Figure 3:
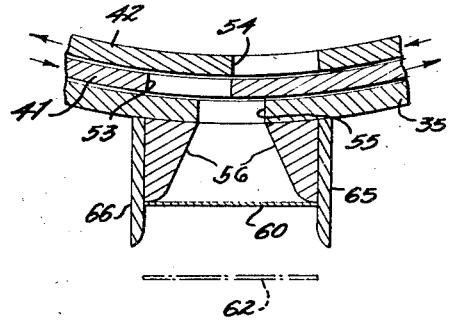
Fig. 3 is a detailed view of the air ports for forming the film loops, taken along the line 3—3 of Fig. 2.

An air chamber of trapezoidal shape is formed by an annular housing plate 35 and an end plate 36, the latter having an air intake pipe 37, which will admit air under pressure to a chamber 39. Inside the chamber, formed by the plates 35 and 36, is an inner, rotatable sleeve or port member 42 and an outer sleeve or port member 41. The port members may be rotated in any suitable manner, such as port member 42 by a shaft 44 connected to the member 42 by a flange 45 and screws, such as shown at 46, and port member 41 by a cylindrical extension of the member 41 concentric of the shaft 44. Bearing sleeves 49 and 50 separate the members 41 and 42 from the shaft 44 and housing plate 35. Referring to Figs. 2 and 3, the port member 41 has a port 53 therein, the port member 42 has a port 54 therein, and housing 35 has a port 55 therein. Extending from port 55, are funnel flanges 56 on walls 65 and 66 shown in Figs. 1 and 2. Similar walls 69, without the funnel, are shown in Fig. 1.

Figure 4:
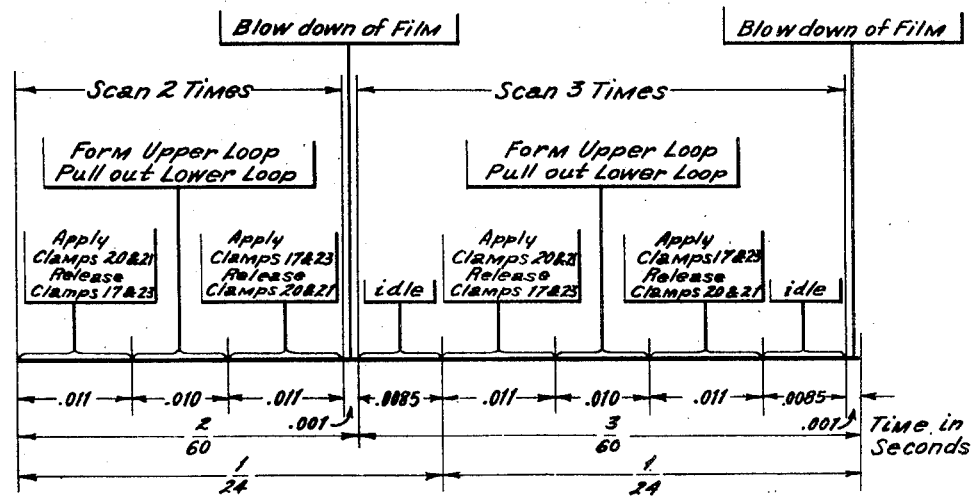
Fig. 4 is a chart showing the relative operation times of the various elements of the mechanism in relation to a television scanning system.

The film advancement cycle will be described in connection with the chart shown in Fig. 4, to which reference will now be made, this chart showing the relationship between the pull-down periods and the scanning periods of a television flying spot system; although, for normal motion picture projection, the pull-down periods may be uniform or equally spaced. First, starting at the instant after the positioning of a frame in the aperture 19 and the beginning of a television scanning period, the clamps 20 and 21 are applied by cams 31 and 32 to hold the film stationary in the gate, and clamps 17 and 23 are released by cams 30 and 33 so that loops may be formed. This action is performed in approximately .011 second, after which sprockets 13 and 25 are rotated for approximately .010 second to form an upper loop, as shown by the double broken lines 68, and to remove the lower loop to the position shown by double broken lines 60. In the next .011 second, clamps 17 and 23 are applied and clamps 20 and 21 are released in preparation for the advancement of a film frame, the sprocket 13 having previously advanced that length of film into loop 68. During these three time periods, the image on the frame of film in the aperture 19 has been scanned twice.

The next action is the "blow down," and this occurs when the port 53 in sleeve 41 and port 54 in sleeve 42 coincide with port 55. As shown in Fig. 3, the film, in position 60, rests on the ends of funnel flanges 56 of wall 65 and 66 when advanced by sprocket 25. When the air from chamber 39 is applied to the film, it is blown to position 62, shown by the double solid lines in Fig. 2 and broken lines in Figs. 2 and 3, by the air blast in about .001 second. It will be noted that, when the film has reached the end of the walls 65 and 66, the air from ports 53, 54, and 55 exhausts past the ends of the pair of walls 65 and 66, which will reduce the pressure on the film and aid in gradually slowing it down or decelerating it to its stop position at 62. To aid in the deceleration, the loop 68 will reach the edges of walls 69 at about the same time the loop 60—62 reaches the edges of walls 65 and 66, and air will be entrapped within a chamber enclosed by walls 69, shoe 16, and the film. To obtain the proper rate of deceleration, a plurality of holes 71 are drilled in the shoe 16 to control the escape of air from the chamber, the film thus being gently brought to rest on the shoe 16.

Now, continuing the film advancement cycle over two frames, for the next .0085 second, the mechanism is idle as far as clamps and intermittent sprockets are concerned; it being realized, of course, that sleeve 41 and 42 and sprockets 9 and 28 continue to rotate and scanning proceeds. Thus, starting one twenty-fourth of a second after clamps 20 and 21 are applied and clamps 17 and 23 are released, the same cycle as just described occurs, there being a subsequent idle period of .0085 second before certain ports are again aligned to advance the film another frame. Thus, in the first two-sixtieths second, the first frame is scanned twice, and during the next three-sixtieths second, the film is scanned three times. The five scanning periods thus correspond to two picture frames photographed in one twenty-fourth second each, including the camera pull-down time.

To obtain the intermittent sprocket and cam action, the sprockets and cams are geared together in the proper ratios. However, to obtain the air blast at one-thirtieth and one-twentieth second time cycles, it has been found that the inner sleeve 42 may be provided with one aperture 54, the sleeve rotating at a rate of forty-eight revolutions per second, while the sleeve 41 is provided with two apertures spaced 144 degrees apart, the sleeve 41 rotating at a speed of sixty revolutions per second in the opposite direction to sleeve 42. At these two rates of speed and aperture placements, there will be an alignment of apertures at stationary aperture 55 after one-thirtieth of a second, and then after one-twentieth of a second, these time periods alternating in serial order.

Although only a single port is shown at 53, 54, and 55, it is to be understood that these ports may consist of a plurality of smaller openings aligned in the direction of rotation of the sleeves so that the ports may be opened very rapidly in a small distance of travel. By the use of double port members rotating in opposite directions, the diameters of the members may be much less than that of a single disc, as disclosed in the above mentioned co-pending application.

It has been found that, with a double claw pulling on a pair of sprocket holes, the sprocket holes would tear out at a pull of ten pounds, and less than that, if the pull is uneven. In tests of film tensile strength, however, it has been found that one hundred to one hundred and ten pounds pull may be applied to thirty-five millimeter film. It was also found that the tensile strength of splices were greater than for the film itself. In the present invention, a pull of only twenty pounds is required to move a seven inch length of film the height of one frame within one-thousandth of a second. Thus, a safety factor of five has been provided.

With respect to the air pressure required to move a seven inch length of film the height of a frame in one-thousandth of a second, it was calculated that a pressure of thirty-two pounds per square inch is required, the maximum port area being 1.5 square inch. Since the air leaks through the sprocket holes, and, after passing the guides 65 and 66, blows past the film, the film is accelerated during approximately one-half of the blow-down period and decelerated during the remainder of this period at a substantially linear rate.

There is thus provided an intermittent film advancing mechanism or film pull-down mechanism in which the pull-down period may be made very rapid, such as of the order of one-thousandth second. This rate is sufficiently fast to permit the projection of motion picture film without a shutter for eliminating objectionable light during this period, since the action of the film is not observable, and is also of a time period which permits the use of the flying spot type of televsion scanning.

I claim:

1. A motion picture projector adapted to have film advanced into an aperture thereof intermittently, comprising a film path structure, a first intermittent sprocket, a second intermittent sprocket, gate means for holding said film stationary in said gate during a predetermined time period, means for producing air under pressure, a chamber between said gate and said second intermittent sprocket to entrap air and formed by certain walls of said structure and a portion of said film, a pair of rotatable valve members for controlling air to said chamber, one of said walls having a port therein adapted to permit air to pass into said chamber at predetermined intervals for blowing said film into a free loop between said gate and said second intermittent sprocket, and a second chamber between said gate and said first intermittent sprocket to entrap air and formed by other walls of said structure and a portion of said film between said gate and said first intermittent sprocket, air being entrapped during substantially one-half the period of time required to eliminate said loop in said second chamber.

2. A motion picture projector in accordance with claim 1, in which said first mentioned chamber comprises parallel side walls extending substantially one-half the distance between the extreme positions of said first mentioned film loop and said second mentioned chamber having parallel side walls extending substantially one-half the distance between the extreme positions of said second mentioned loop, said second mentioned chamber having air passages therein to control the deceleration of said film into said second mentioned chamber by determining the rate of escapement of air from said second mentioned chamber.

3. A motion picture projector in accordance with claim 1, in which said rotatable valve members rotate in opposite directions, one of said members having a different number of ports therein than the other of said members, said members rotating at different speeds to provide unequal time periods between the openings of said valve members.

4. A mechanism for controlling the intermittent rapid movement of a portion of a film strip from one position to another position, comprising a pair of path sections having walls through which the film travels for entrapping air between said walls of said sections and portions of said film strip, a film gate positioned between said sections, an air source, means for controlling the entrance of air into one of said sections to move the portion of the film entrapping the air therein into a loop to move the film portion in said gate out of said gate, said film loop portion releasing said air when said loop portion has moved over a certain distance of its travel, said movement of said gate portion and loop portion of said strip moving a third portion of said strip into said other film path section to entrap air therein when moved over a portion of its travel, and means for determining the rate of escapement of said entrapped air in said other section.

5. A mechanism in accordance with claim 4, in which said sections have parallel side walls, the edges of said respective portions of said film being movable adjacent said walls, the depth of said walls being approximately one-half the length of the total movement of the film loop portions.

6. A mechanism in accordance with claim 4, in which said last mentioned means is an apertured wall of said other section in which said air is entrapped, air being entrapped in said other section at approximately the same instant the air is released from said first section.

ALDA V. BEDFORD.

REFERENCES CITED

The following references are of record in the file of this patent:

UNITED STATES PATENTS

| Number | Name | Date |
|---|---|---|
| 960,794 | Bingham | June 7, 1910 |
| 1,244,920 | Thomas | Oct. 30, 1917 |
| 1,309,471 | Evans | July 8, 1919 |
| 1,393,735 | Anselmi et al. | Oct. 18, 1921 |

FOREIGN PATENTS

| Number | Country | Date |
|---|---|---|
| 10,266 | Great Britain | of 1915 |